United States Patent [19]

Archer et al.

[11] Patent Number: 4,709,948
[45] Date of Patent: Dec. 1, 1987

[54] FIBRE REINFORCED POLYMERIC ARTICLE

[75] Inventors: Joel Archer, Nucourt; Denis V. Wassenhove, Crepy en Valois, both of France; Kenneth B. Pithouse, Swindon, England; Leslie J. Buck, Swindon, England; Jeffrey P. Molyneux, Swindon, England; Peter S. Bradshaw, Swindon, England

[73] Assignee: Raychem Limited, England

[21] Appl. No.: 830,387

[22] Filed: Feb. 18, 1986

Related U.S. Application Data

[63] Continuation-in-part of Ser. No. 767,300, Aug. 19, 1985, abandoned.

[51] Int. Cl.[4] .......................................... F16L 25/00
[52] U.S. Cl. ..................................... 285/381; 285/909; 285/915; 156/86; 156/304.2; 156/304.3
[58] Field of Search ................. 285/381, 21, 909, 915; 156/86, 304.2, 304.3; 174/DIG. 8; 403/28; 428/36, 238, 913

[56] References Cited

U.S. PATENT DOCUMENTS

| | | |
|---|---|---|
| 2,027,962 | 1/1936 | Currie . |
| 2,739,829 | 3/1956 | Pedlow et al. . |
| 2,836,529 | 5/1958 | Morris ............................ 428/238 X |
| 3,086,242 | 4/1963 | Cook . |
| 3,235,289 | 2/1966 | Jones ............................ 156/304 L X |
| 3,382,121 | 5/1968 | Sherlock . |
| 3,415,287 | 12/1968 | Heslop et al. . |
| 3,466,210 | 9/1969 | Wareham ..................... 174/DIG. 8 |
| 3,582,457 | 6/1971 | Barthell ............................ 156/86 X |
| 3,597,372 | 8/1971 | Cook . |
| 3,957,382 | 5/1976 | Greuel, Jr. et al. . |
| 3,975,039 | 8/1976 | Penneck et al. ................. 285/381 X |
| 4,133,562 | 1/1979 | Andren . |
| 4,144,404 | 3/1979 | DeGroef et al. . |
| 4,200,676 | 4/1980 | Caponigro et al. ............... 156/86 X |
| 4,335,664 | 10/1982 | Cook et al. ......................... 156/86 X |
| 4,398,982 | 8/1983 | Witerski ....................... 156/304.3 X |
| 4,421,582 | 12/1983 | Horsma ................................ 156/86 |
| 4,500,371 | 2/1985 | Groot ................................ 428/36 X |
| 4,521,470 | 6/1985 | Overberg et al. ................ 156/86 X |
| 4,549,752 | 10/1985 | Nimke et al. ....................... 285/381 |

FOREIGN PATENT DOCUMENTS

| | | |
|---|---|---|
| 52476 | 5/1982 | European Pat. Off. . |
| 100170 | 2/1984 | European Pat. Off. . |
| 117738 | 5/1984 | European Pat. Off. . |
| 8035882 | 11/1982 | Japan . |
| 1088572 | 10/1967 | United Kingdom . |
| 1440524 | 6/1976 | United Kingdom . |
| 2076489 | 12/1981 | United Kingdom . |
| 2135673 | 9/1984 | United Kingdom . |
| 2139227 | 11/1984 | United Kingdom . |
| 2139228 | 11/1984 | United Kingdom . |

Primary Examiner—Dave W. Arola
Attorney, Agent, or Firm—Yuan Chao; Edith A. Rice; Herbert G. Burkard

[57] ABSTRACT

Pipe couplings are formed by consolidation of a polymer into braided fibre reinforcement by recovery of a heat-recoverable driver thereover. A liner, e.g. of non-cross-linked polyvinylidene fluoride, may be used, preferably with three layers of polymer/braid, to achieve a Freon-tight seal for coupling loosely swaged or butt-jointed refrigerator pipes. Braids carrying a consolidatable polymer which allows the braid crossover points to slip freely during recovery of the driver are preferred for optimum performance.

50 Claims, 6 Drawing Figures

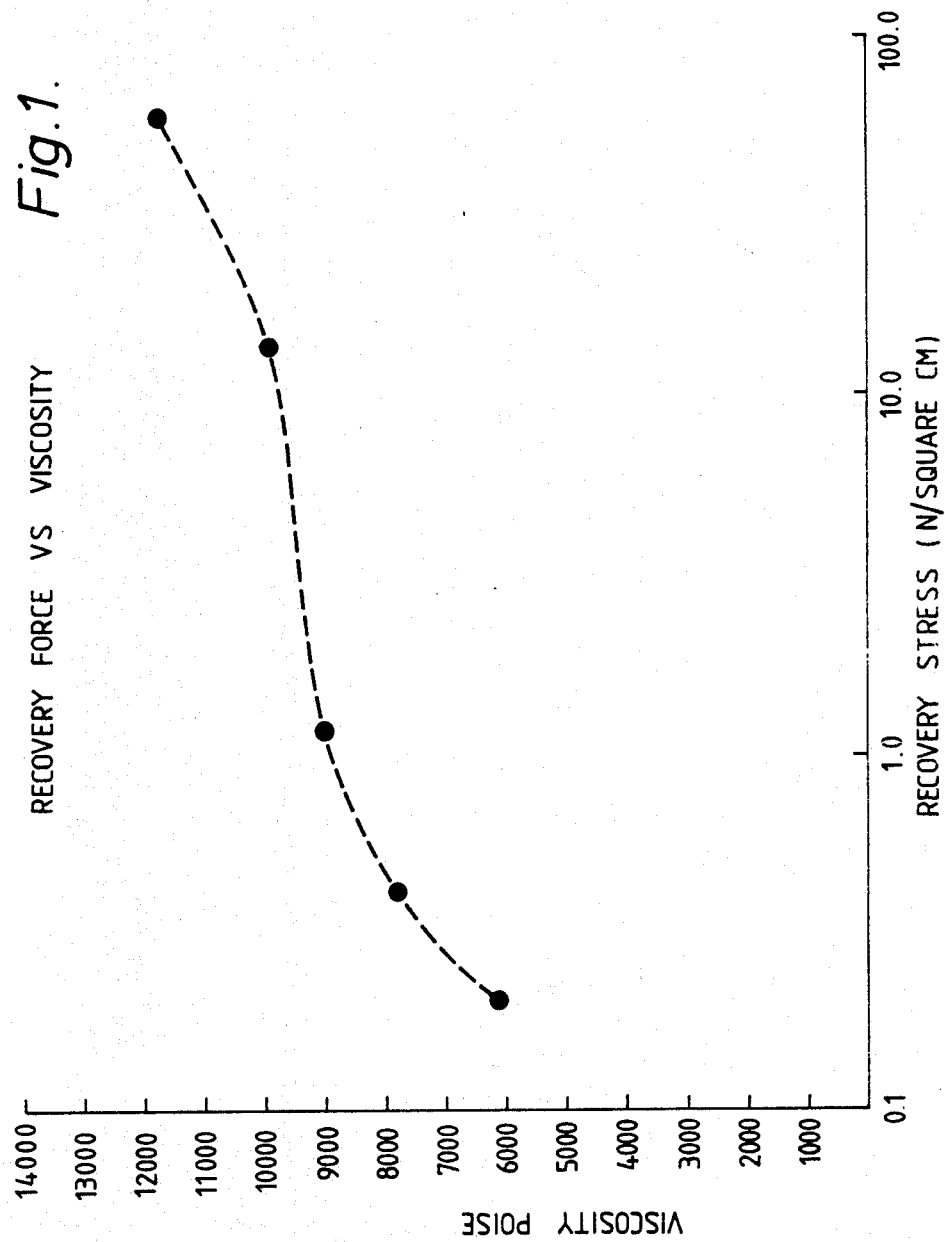

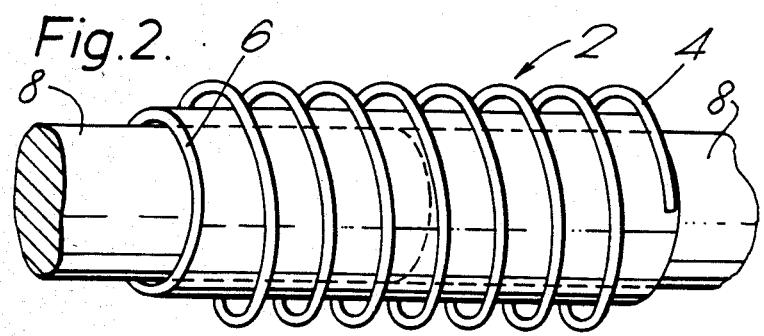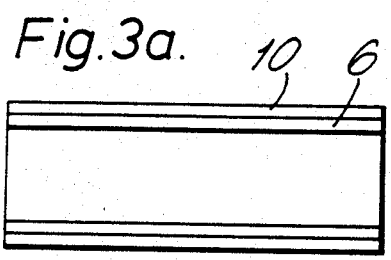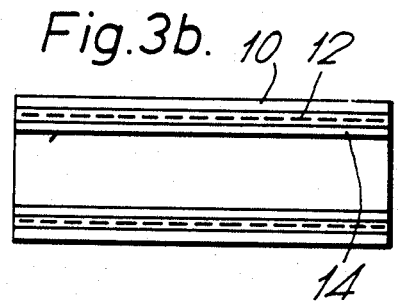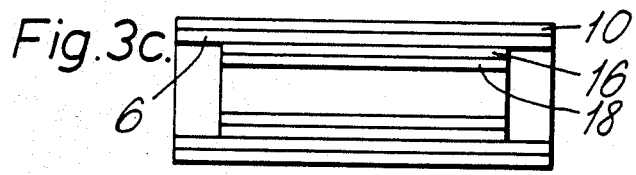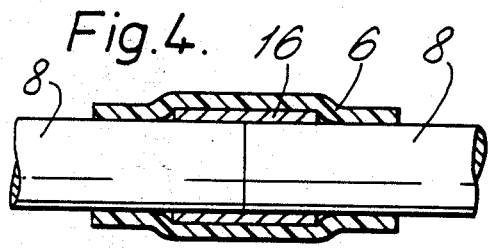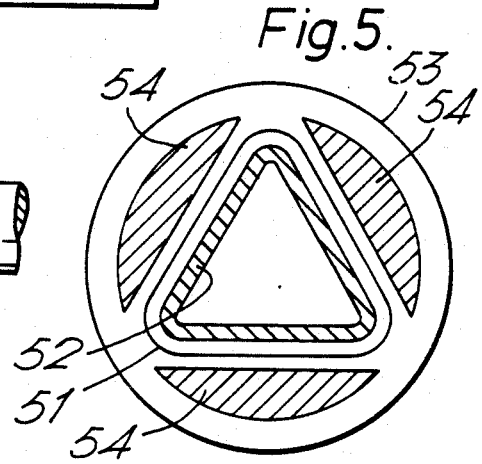

FIBRE REINFORCED POLYMERIC ARTICLE

This application is a continuation-in-part of application Ser. No. 767,300, filed Aug. 19, 1985, and now abandoned, the disclosure of which is incorporated herein by reference.

This invention relates to tubular fibre-reinforced polymeric articles which may be used, for example, to couple objects, for example pipes.

Fibre reinforced composite tubes, which typically comprise a polymeric material reinforced by fibres, for example in the form of a fabric, have been used hitherto for a variety of applications. They are particularly useful in applications where low weight is of importance, for example in aircraft. Typical applications include ducts and low-load structural members, for example aircraft seats.

Japanese Patent Application No. 8035882 (Mitsubishi), describes the formation of a fibre reinforced epoxy resin composite tube in which voids are minimised by shrinking a heat shrinkable tube with a force of at least 2 kg/cm$^2$ over a fibre-reinforced resin at its hardening temperature on a suitably shaped mandrel. The finished dimensionally stable resin tube is removed from the mandrel for subsequent use and the shrinkable tube discarded.

Combinations of shrinkable plastics materials and fabrics wherein the shrinkable material is retained after shrinkage are also known. British Patent Specification No. 1088572 (Raychem-Cook), for example, describes a tubular, heat-shrinkable, synthetic plastics material having a reinforcing tubular liner of knitted fibres, which may be impregnated with adhesive.

The load-bearing capability of composite tubes known hitherto has, however, been limited, and accordingly composite tubes have not been used hitherto for high load bearing applications. It is an an object of the present invention, inter alia, to provide a fibre reinforced tubular article that can be used in high load bearing applications, for example as a coupler for pipes, where a high pull-out and burst strength is required, to provide a method of coupling objects using a composite tube, and to provide a method of making a fibre reinforced, composite tubular article.

A first aspect of the present invention provides a method of coupling two substrates, for example generally elongate substrates such as pipes, comprising (a) positioning around or within contiguous portions of the substrates a coupling assembly comprising a heat-recoverable driver and telescoped therewith tubular coupling means comprising substantially unconsolidated fibre reinforcement and a polymeric material and (b) applying heat to recover the driver and to cause the polymeric material to flow such that the recovering driver consolidates the coupling means (and preferably bonds it to the elongate substrates) thereby coupling the substrates together.

A second aspect of the present invention provides a coupling assembly for coupling elongate objects, comprising a heat recoverable tubular driver and telescoped therewith tubular coupling means comprising substantially unconsolidated fibre reinforcement and a polymeric material that is capable of flowing when the assembly is heated, the arrangement being such that the assembly can be heated when positioned around the elongate objects to recover the driver and to consolidate the coupling means, thereby coupling the objects together and such that the consolidated coupling means alone is capable of coupling the elongate objects after removal of the recovered driver, the flowable polymeric material being substantially solid at least at the intended operation temperature of the consolidation coupling means.

The tubular member preferably has two open ends. Preferably the member is generally circular in cross section and especially preferably is cylindrical. Both straight and bent tubular members are included.

A heat recoverable article is an article whose dimensional configuration may be made to change when subjected to heat treatment. A heat recoverable article may be, for example, heat shrinkable, that is it may recover by shrinkage when heated, or it may be, for example, heat expandable, that is it may recover by expanding when heated.

Heat recoverable articles usually recover, on heating, towards an original shape from which they have previously been deformed but the term "heat-recoverable", as used herein, also includes an article which, on heating, adopts a new configuration, even if it has not been previously deformed.

In their most common form, heat-recoverable articles comprise a heat-shrinkable sleeve made from a polymeric material exhibiting the property of elastic or plastic memory as described, for example in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric article into the desired heat-unstable form, subsequently cross-linking the polymeric material, heating the article to a temperature above the crystalline melting point or, for amorphous materials the softening point as the case may be, of the polymer, deforming the article and cooling the article whilst in the deformed state so that the deformed state of the article is retained. In use, since the deformed state of the article is heat-unstable, application of heat will cause the article to assume its original heat-unstable shape.

In other articles, as described, for example, in British Pat. No. 1,440,524, an elastomeric member such as an outer tubular member is held in a stretched state by a second member, such as an inner tubular member, which upon heating weakens and thus allows the elastomer member to recover.

The driver and the coupling member are preferably telescoped such that the driver is on the outside of the coupling member and the driver is arranged to recover radially inwards, that is to be heat shrinkable. In another embodiment where the substrates to be coupled are hollow, for example where the substrates are pipes, the driver may be positioned within the coupling member and be arranged to recover outwardly to couple the substrates internally. An external driver is however preferred even for hollow substrates such as pipes. In use, when the coupling member has been consolidated and bonded to the substrates, the driver may, if desired, be removed and discarded.

A particularly high strength composite tube, may be made if the polymeric material of the coupling member has a viscosity of at least 2500 Poise, preferably at least 2000 Poise, more preferably at least 5000 Poise, especially preferably at least 10000 Poise, at the consolidation temperature. Many thermoplastic polymeric materials, particularly those having a high melting point typically have a viscosity above this preferred value of 2500 Poise at the consolidation temperature. These thermoplastic materials may accordingly be used in the preferred embodiments. As specific examples there may be mentioned nylon and aromatic polymers, for example polyaryletherketones. Where a thermoplastic material is used the composite tube may be operated at temperatures up to the melting point of the thermoplastic. Typical high melting point thermoplastics, for example polyaryletherketones have a melting point of about 360° C., and composite tubes according to the present invention made using such polymers can accordingly be operated up to about 360° C. For preferred performance the composite tubes according to the present invention are preferably operated below the glass transition temperature, Tg, of the polymers. For typical high melting point polymers, such as polyaryletherketones, Tg is typically in the range 150° C.–260° C.

The use of thermoplastic polymer based composites rather than thermosetting polymer based composites is preferred for many applications for a variety of reasons. In particular thermoplastic polymer based composites may be postformed, that is once consolidated they may be reheated above the melting temperature of the thermoplastic and deformed to change the shape of the composite. This allows the composites to be made in shapes that are easy to manufacture and/or store and/or transport, the shapes being postformed later to the shape required for operation. For example thermoplastic composites may be made as straight tubes and post-formed into bent tubes as may be required, for example, for a stabiliser for a vehicle or for a strengthening stringer on an aircraft. Also thermoplastics may be used which have tensile and bending strength, high toughness, rain erosion resistance and abrasion resistance. Furthermore, thermoplastic materials are typically easier to handle and fabricate into composite structures than thermosetting materials since at manufacturing temperatures the surface of a thermosetting material tends to be "tacky, while that of a thermoplastic material is "dry".

The fibres of the fibre reinforcement of the coupling member are preferably provided by a fabric layer, especially preferably by a braid. Other fabric constructions, for example, weaves or knits may also be used. The fibres of the fabric may be provided as single fibres, or in bundles of fibres commonly known as "tows". As other examples the fibre reinforcement may be provided by short lengths of fibres, for example as short chopped fibres or staple fibres, or by filament wound fibres.

The material of the fibre reinforcement is preferably compatible with the polymeric material, and the fibre reinforcement is preferably incorporated in the polymeric material at a sufficiently high density to provide structural strength to the coupling. As examples of fibres that may be used there may be mentioned carbon, glass, boron, and silica fibre, natural fibres such as cotton, organic fibres such as nylon polyesters and polyamides, and metallic fibres such as stainless steel and aluminium. A single type of fibre may be used or a combination of different types of fibre. Also where a fibre comprises a bundle of filaments in a so-called 'tow' or 'roving' the filaments in each tow or roving may be the same or different. Thus for example a mixed tow may comprise a bundle of both organic and inorganic filaments. As examples, in some embodiments, it is preferred for at least some of the fibres to be metal, for example where the joint between the substrates to be electromagnetically shielded. In other embodiments it is preferred to incorporate some conductive fibres, for example metal or conductive polymeric fibres to enable an electrical current to be passed through the coupler.

The softening temperature of the fibres of the fibre reinforcement is preferably greater than the softening temperature of the polymeric material. The difference between the softening temperatures is preferably in the range 5° to 50° C., more preferably 15° to 35° C., especially preferably about 20° C.

The fibre reinforcement and the polymeric material of the coupling member may be provided in a variety of substantially unconsolidated arrangements, by which is meant that the individual fibres, or groups of individual fibres (especially tows), are not joined together by the polymeric material to any significant extent. Consolidation causes the polymeric material to spread out and join the fibres together. In one embodiment a fibre reinforcement and the polymeric material are provided as discrete layers. Thus, for example a coupler according to the invention may comprise an outer driver, an inner polymeric layer, and a fibre reinforcement layer, for example a braid sandwiched therebetween. Alternatively the fibre reinforcement and the polymeric layer may be interchanged such that the fibre reinforcement layer is the inner layer.

In a further preferred embodiment where a fibrous layer with its own integrity is used, for example a fabric layer, the polymeric material is provided as a coating or an impregnation of the fibres of the reinforcement. Where a fabric is used the fibres may be coated or impregnated with polymeric material before they are made into a fabric, or the fabric may be made first and then the finished fabric coated or impregnated with the polymeric material. It is especially preferable and convenient to manufacture the fabric from commercially available, so-called "prepreg" (pre-impregnated) fibres or tows.

It is especially preferred to use a braid in which the fibres or filaments making up the braid have been pre-coated and/or pre-impregnated with a polymeric material having a sufficiently high softening temperature so that when the assembly is heated to recover the driver the surface of the fibres is not "tacky" and thus the fibres are free to slide over each other. In particular at the cross-over points of the braid the fibres are free to slide relative to each other and it is preferable that the fibres have minimal adhesion to the recovering driver. This enables the braid to change its braid angle during the recovery of the driver which change in braid angle enables the braid to conform to the shape of the recovering driver. The method of change of shape of the braid by a change in braid angle is particularly preferred since it means that the fibres which make up the braid remain straight and no wrinkling of the fibres, which tends to weaken the resulting composite, is required in order to accommodate the shape change. Preferably, the softening temperature of the polymer is not significantly higher than the recovery temperature of the driver, such that further heating of the assembly softens the polymer allowing the composite to consolidate under the action of the recovering driver. Preferably however the softening temperature is sufficiently high to allow some tolerance in the application of heat while still preventing premature softening which would prevent slippage at the braid angle cross-over points. Preferably the difference in temperature between the softening temperature of the polymer and the recovery temperature of the driver is in the range 5° to 50° C., more preferably in the range 15° to 35° C., especially preferably about 20° C.

If a two or more component coating, for example two or more layer coating is applied to the fibres, the above stated criteria for the softening temperature of the polymeric fibre apply to the outer coating only.

The combination of a recoverable driver and a polymeric precoated or preimpregnated braid with a predetermined softening temperature to enable slippage of the braid cross-over points is novel per se and forms part of the present invention. Accordingly a third aspect of the present invention provides an assembly for forming a composite article comprising a heat recoverable driver and a braid made from fibres which have been pre-coated or pre-impregnated with a polymeric material, which polymeric material has a sufficiently high softening temperature so that when the assembly is heated to recover the driver the braid is caused to change its braid angle by slippage of the braid fibres at their cross-over points to conform to the shape of the recovering driver, and then on further heating the polymeric material is caused to flow and consolidate the braid to form the composite article.

The polymer material for the coupling member may be selected according to the requirements from known compounds. As stated above, particularly where high structural strength is required, it is preferred to use a polymeric material having a viscosity, at the consolidation temperature, higher than 2500 Poise, preferably higher than 5000 Poise, more preferably higher than 10000 Poise, especially preferably higher than 20000 Poise.

Examples of two especially preferred combinations of fibre reinforcement and polymeric material that may be used for the coupling member are glass fibre or carbon fibre with either nylon or polyaryletherketone.

Where the fibres are pre-impregnated or pre-coated, a single type of impregnation/coating may be used on all of the fibres or a different type of impregnation/coating may be used on different fibres.

Where a curable polymeric material is used, first and second curable components may be provided as coatings or impregnations on different fibres or as overlying coatings on a single fibre. As examples, there may be used in the present invention the curable components and the fibres and fabrics described in U.K. Patent Application Publication No. 2135673, 2139227 and 2139228, and European Published Application No. 0117738. These however, tend to be somewhat more soft and tacky during driver recovery than the preferred free-sliding materials hereinbefore mentioned.

Turing now to the driver, this may take many forms. In a preferred embodiment the driver is tubular, having two open ends, and is, preferably generally cylindrical. As other examples, the driver may be in the form of a so called "wraparound" sleeve, that is in the form of a flat sheet that is wrapped around or within the coupling member, opposed edges of the sheet being held together by a closure member, or the driver may be in the form of a tape, or a single fibre or a wire that is helically wrapped around or within the coupling member or in the form of a fabric for example a woven or braided member.

The form and the material of the recoverable driver, must be selected such that the recovery force is sufficient to consolidate the polymer of the fibre reinforced member. Preferably the material of the driver is polymeric. Thus, for example a heat recoverable polymeric tubular driver may be used, or a heat-recoverable polymeric, spirally wrapped fibre.

It was expected that as the viscosity of the polymeric material to be consolidated increased, the force required to effect consolidation would increase correspondingly. However it has surprisingly been found that unexpectedly low recovery forces are required to consolidate polymeric materials of high viscosity. Thus for example to consolidate a fibre reinforced polyaryletherketone tube recovery forces of the order of 50 to 60N (corresponding to 5 to 6 Kg/cm$^2$) are required. This is compared with the value of 2 Kg/cm$^2$, preferably 5 Kg/cm$^2$ described in Japanese Pat. No. 8035882 (Mitsubishi), referred to above, to make an epoxy resin composite. Thus a first polyaryletherketone which has a viscosity of about 4–5000 Poise at the recovery temperature of a second polyaryletherketone used as a driver for the first polyaryletherketone, can be consolidated by a force only slightly larger than that used for an epoxy resin which has a viscosity five or six times lower, in the range 800 to 1000 Poise.

Consolidation of the composite tube and bonding of the coupling member to the substrates is achieved by first heating the polymer sufficiently to allow it to flow under the influence of the recovering driver into the interstices between the fibres, and then allowing the tube to cool.

The temperature to which the article must be heated to effect the consolidation depends on the materials of both the fibre reinforced polymer and the driver. In general as the temperature rises the viscosity of the polymer decreases so that it can flow more readily. On the other hand as the temperature rises the recovery force of the recoverable driver decreases for most recoverable drivers. Thus an appropriate combination of driver and coupling member must be selected which counterbalances the decrease in viscosity (which enhances consolidation) and the decrease in recovery force (which detracts from consolidation). Also, where a thermoplastic is used, the temperature of consolidation must be well above the temperature of operation of the consolidated tube, otherwise the thermoplastic polymer will remelt during operation.

Selection of an appropriate driver and coupling member polymeric material may be made with reference to the graph in FIG. 1 of the accompanying drawings. This shows the recovery force needed to consolidate the coupling member as a function of the viscosity of the polymeric material of that member. Thus given the viscosity of a polymer at or just above its melting point, the recovery force of the driver needed to effect consolidation at that temperature may be read from the graph. If it is desired to use a driver with a lower recovery force than that required at the melting point of the polymer, it is necessary simply to increase the temperature further above the melting point of the polymer until the viscosity of the polymer is reduced to the value indicated by the graph which can be consolidated by the desired lower recovery force. The graph of FIG. 1 was calculated using the following procedure:

1. The recovery stress of five heat shrinkable drivers were measured at 200°, 220°, 235°, 250°, 300° and 350° C. Two spirally wrapped fibre drivers were used, viz spirally wrapped polyester fibre, and drawn polyaryletherketone fibre, and three tubular drivers viz polyvinylidene fluoride tubing, nylon tubing and a silicone elastomer tubing.

(a) For the spirally wound fibres, the recovery stress of a straight fibre was measured by clamping a single fibre between the jaws of an Instron Tensile Testing Instrument at the required temperature and monitoring the recovery force exerted, and the recovery force of a spirally wound fibre was then calculated, given the value for the straight fibre.

(b) For the tubular drivers, the recovery stress was measured by recovering the tube over a split mandrel held in an Instron Tensile Testing Instrument at the required temperature and monitoring the force exerted.

2. The viscosity of several thermoplastic materials (including nylon 6) were measures in the temperature range ambient to 350° C. using a Rheometric Dynamic Spectrometer.

3. Consolidation of a braid of glass fibre tows impregnated with nylon 6 was carried out in a laboratory oven on a stainless steel mandrel between the temperature range of 200° C. to 350° C. The temperature at which consolidation took place was noted, consolidation being measured visually, microscopically and by noting the differences in the densities of the braided material.

4. The results are set out in Table I.

5. The results set out in the table determine the temperature at which consolidation takes place for each driver. (1) above gives the recovery force of that driver at the observed consolidation temperature, and (2) above gives the viscosity of the thermoplastic being consolidated at the observed consolidation temperature. Thus graph of FIG. 1 can be constructed. The five points plotted on the graph are generated, reading left to right, by the polyvinylidene fluoride tubing, nylon fibre, silicone tubing, polyester fibre, and the polyaryletherketone fibre respectively.

Application No. 124276, and are thought not to require further detailed description herein.

A particularly preferred article according to the present invention comprises a fibre reinforced layer comprising a braid of carbon fibre tows impregnated with polyaryletherketone of lower Tg in combination with a spirally wound driver of a polyaryletherketone monofilament of higher Tg. Polyaryletherketone impregnation which starts to flow at about 340° C. can be used with a polyaryletherketone driver which has a sufficiently high recovery force at that temperature to consolidate the braid. For example, the impregnation polymer may comprise the repeat unit -aryl-ether-aryl-ether-aryl-ketone- and the driver polymer the repeat unit -aryl-ether-aryl-ketone.

The recovering driver not only effects consolidation of the composite tube but also enhances bonding of the coupling member to the substrates by applying a force to the bond interface. The bonding achieved depends on the substrates to which the coupling is applied. As examples bonding may be, for example by adhesion, or by fusion. For an adhesive bond the polymeric material of the coupling member itself may act as an adhesive on the substrate or a separate adhesive may be used (as described below). Adhesive bonding may be used for example, for bonding to a metal substrate. By a fusion bond is meant a bond wherein the polymeric material of the coupling member, (or of any additional lining layer between the coupling member and the substrate) and the material of the substrate flow together to form a homogenous bridge between the parts with no discernable interface therebetween. Fusion bonding might be used for example for bonding to a polymeric substrate.

Where the polymeric material comprises curable components, it is believed that there is a synergestic effect between the recoverable driver and the curing components. Thus it is believed that the recoverable driver not only urges the two components into physical contact with each other, but also enhances curing. Thus when the heat-recoverable driver is recovered onto components the curing will be sonner than if it is heated on its own to the same temperature, or it will cure at a significantly lower temperature than it will when heated on its own.

TABLE I

| Driver | Temperature °C. | | | | | |
|---|---|---|---|---|---|---|
| | 200 | 220 | 235 | 250 | 300 | 350 |
| Polyester spirally wrapped fibre | X | X | SL | GOOD | — | — |
| Polyvinylidene fluoride tubing | X | X | X | SL | GOOD | — |
| Nylon tubing | X | X | X | SL | GOOD | — |
| Silicone elastomer tubing | X | X | X | SL | SL | GOOD |
| Polyaryletherketone spirally wrapped fibre | X | SL | GOOD | GOOD | GOOD | GOOD |

SL = Slight consolidation of nylon impregnated glass fibre braid
GOOD = GOOD consolidation of nylon impregnated glass fibre braid
X = NO consolidation of nylon impregnated glass fibre braid
— = No measurements made A particularly preferred group of materials which have a high recovery temperature and appreciable recovery force even at high temperatures, and which can accordingly be used in combination with a polymer having high viscosity at ambient temperatures and therefore need to be heated to high temperatures to cause them to flow, are polyaryletherketones. Polyaryletherketones (or polyarylene ether ketones) are now widely known, having been described in numerous publications, for example published European Patent The synergistic increase in the rate of curing of certain components when used in conjunction with a recoverable article is most pronounced when the fusion temperature of the components is in the region of the recovery temperature of the cover or the temperature to which the components are heated when the cover is recovered. Preferably the fusion temperature is not more than 50° C., especially not more than 30° C. and most especially not more than 10° C. above the recovery temperature of the article. Also preferably, not more than one, and especially none, of the components has a fusion temperature of less than 50° C. Each of the components preferably has a fusion temperature in the range of 70° to 120° C. and most preferably from 70° to 100° C., and, instead or in addition, each has a fusion temperature that differs from the fusion temperature of the or each other reactive component by not more than 30° C.

After consolidation of the coupling member the driver may or may not be retained. Where lack of space is a problem, and, or where low weight is important it is preferred to discard the driver. For other applications, the extra step of discarding the driver may be unnecessary. Indeed for some applications retention of the driver is a positive advantage since, for example, it provides additional burst strength to the coupling.

For some applications it is preferred to include a liner between the coupling member and the substrates to be coupled. For example, although the polymeric material of the coupling member may itself act as an adhesive to bond the coupling member to the substrates, for some applications it is preferred to include an additional adhesive or sealant as a liner, either to improve the bond to the substrates or to improve the environmental sealing of the coupled substrates, or both. The adhesive or sealant liner may comprise the same material as the polymeric material of the coupling member, to enhance bonding between the liner and the coupling member. As examples of adhesives and sealants that may be used there may be mentioned hot melt adhesives such as low molecular weight polyamides and that class of thermoplastic materials known as nylons. Applications where it is preferred to include a separate adhesive or sealant liner include applications where a high strength either burst or pull out strength, is required of the couplings. In such cases it is preferred to use a coupling member that has a high fibre density. The coupling member consequently has a low polymer density and the quantity of polymer in the coupling member may therefore be insufficient both to consolidate the tube and to flow to bond and to seal to the substrates, making it preferable to include an additional adhesive or sealant liner. The adhesive or sealant liner is preferably tubular.

In another embodiment it is preferred to include an impermeable layer, for example a (preferably substantially non-crosslinked) polyvinylidene fluoride layer or a metal layer for example of aluminium foil, between the coupling member and the substrates. It is believed that the impermeable layer acts to spread out any pressure acting on the coupling member over its entire surface, thus minimising the possibility of localised failure of the coupling member, and hence improving the strength, particularly the burst strength of the coupling member.

The liners described above may be used alone, or in combination. Indeed where an impermeable layer is used which is not itself bondable directly to the substrates, an additional adhesive layer may also be included.

A single liner may be used, or a plurality of shorter liners. For example, two tubular liners may be included, one at each end of the coupling member.

Where a single liner is used it is preferably shorter in length than the coupling member, and positioned such that a length of coupling member projects at either end thereof. With this arrangement the direct bonding of the coupling member to the substrate at each end of the arrangement prevents the substrates pulling apart from each other, which they might tend to do if the liner were coterminous with the coupling member.

A particularly preferred embodiment comprises an outer glass fibre/nylon impregnated coupling member, with a lining layer of polyvinylidene fluoride, coated with a hot melt polyamide adhesive, the liner being shorter than the coupling member.

Couplers according to the present invention may advantageously be made having very high performance, in particular having good tensile strength, burst strength and pull out strength and also good sealing against fluids having a high diffusion coefficient, which are typically difficult to seal, for example, Freon (Trade Mark). The couplers are therefore particularly suitable as pressure retaining couplers for fluid carrying pipes for example for coupling refrigeration pipes and fuel line pipes, particularly aviation fuel-line pipes where a low weight is important, and also for joining water pipes and central heating pipes. The coupler may also, advantageously, be used to join pipes of dissimilar material. Advantageously the coupling may be made sufficiently strong that the contiguous end portions of the pipes may be joined in an end to end butt joint, or in a relatively loose (and therefore easily formed) swaged joint, thus avoiding the precise close-fitting swaging of the pipes generally required with prior art couplers to achieve a strong coupling. Clearly, the methods and assemblies of the present invention may be applied to coupling contiguous substrates, especially contiguous end portions of the substrates, in other, not necessarily abutting, arrangements.

Consolidation of a fibre reinforced tube of polymeric material having viscosity greater than 2500 Poise is also new per se, and thus a method of consolidation in the absence of a permanent underlying substrate also forms part of the present invention. Thus a third aspect of the present invention provides a method of forming a composite tubular member comprising (i) providing a heat recoverable driver and a tubular member telescoped therewith, the tubular member comprising fibre reinforcement and polymeric material (ii) positioning the telescoped members around an inner forming-mandrel and (iii) heating the telescoped members to cause the driver to recover to urge the tubular member into contact with the mandrel and to consolidate the first tubular member, the polymeric material having a viscosity of at least 2500 Poise, preferably 3000 Poise at the temperature at which consolidation takes place.

After recovery the driver, or the mandrel, or both, may be discarded. The fibre reinforced tube manufactured by the method according to the third aspect of the present invention may be used, for example, as a structural member, or for example as a coupler.

Where the polymeric material is a thermoplastic material, the tube made according to the present invention may be incorporated into a recoverable assembly, by reheating the tube above the softening point of the thermoplastic, positioning a recoverable driver within or around the tube, and recovering the driver to deform the softened composite tube. The driver that was used in the manufacture of the composite tube may be used for this purpose (provided it has some residual recovery after manufacture of the tube) or a new driver may be used. Thus the composite tube made according to the third aspect of the present invention may be used in a recoverable assembly, for example as a coupler.

The invention also includes an assembly wherein the driver has been recovered to form a consolidated article, the polymeric material has been subsequently crosslinked, and the consolidated article has been deformed so as to render the consolidated article heat-recoverable.

Embodiments of the present invention will now be described, by way of example, with reference to the accompanying drawings, wherein:

FIG. 1 is a graph, as described above, showing the variation in recovery force of the driver required for consolidation of the coupling member as a function of the viscosity of the polymeric material of the coupling member;

FIG. 2 is a perspective view of a coupler according to the invention positioned ready for coupling two abutting pipes;

FIGS. 3(a) to (c) are sectional views of different embodiments of coupler according to the invention; and FIG. 4 shows the coupling member of the coupler of FIG. 3(c) installed on two abutting pipes.

Referring to the drawings, FIG. 2 shows a coupler 2 comprising a driver 4 in the form of a helically wound heat recoverable polyarylene either ketone fibre, and a tubular coupling member 6 comprising a braid made from glass fibre preimpregnated with Nylon 6. The coupler 2 is positioned around, and is a loose fit around, abutting ends of pipes 8.

FIG. 2 shows alternative embodiments of coupler according to the present invention the outer driver (10) is identical in each case and comprise a heat recoverable polyolefin. The inner coupling member (6) in FIG. (3a) is identical to that of FIG. 1. The inner coupling member in FIG. 3b comprises a separate glass fibre braid (12) and nylon polymeric layer (14). The inner coupling member (6) of FIG. (3c) is identical of FIGS. 2 and (3a). An inner liner (16,18) is, however, included. The inner liner comprises polyvinylidene fluoride (4) and a layer (18) of hot melt adhesive coated on the polyvinylidene liner to bond it to the substrate. The liner extends only part way along the coupler and provides additional strength to the coupler in particular improved burst strength.

The installation of any of the couplers shown in FIGS. 2 and 3 is effected by heating the coupler causing the driver (4,10) to recover and the polymeric material of the coupling member to flow into the interstices between the fibres and thus consolidate. The recovering driver exerts a pressure on the polymeric material enhancing the consolidation. Also the recovering driver causes the braid to change its braid angle and conform to the underlying substrate and by exerting pressure of the substrate enhance the bond to the substrate.

FIG. 4 shows the coupler of FIG. 3c coupling two pipes. The coupling member (6) has conformed to the underlying pipes and consolidated. Also the adhesive layer (18) and the nylon of the coupling member 6 has flowed to bond the coupler to the substrate. The driver 10 has been discarded.

FIG. 5 shows in schematic end view a further ingenious aspect of the invention in which a fibre reinforcing member 51 carrying polymeric material suitable for consolidation is positioned around a sharp-cornered substrate 52 (triangular by way of example). In order to consolidate the structure reasonably uniformly upon recovery of the tubular driver 53, suitably shaped filler pieces 54 are positioned to spread the recovery forces more evenly over the circumference of the reinforcing member and substrate, avoiding the concentration of consolidation at the corners which would otherwise occur. Differently shaped filler pieces may readily be devised to suit other sharp-cornered or irregular substrates, the term "sharp-cornered" implying only that the substrate has a shape which would localise or concentrate the consolidation to an undesirable degree, without limitation to any specific shape or degree of sharpness or regularity. Preferably the filler pieces will be shaped to provide a substantially smoothly convex substantially continuous outer surface, more preferably a surface of substantially ovoid or substantially circular cross-section, on which the recovering driver will bear. The filler pieces and/or the driver may or may not be removed after the consolidation. This aspect of the invention accordingly provides a method or assembly wherein there is provided at least one filler piece shaped so that when placed in use between the driver and the coupling means or braid when positioned around a sharp-cornered or irregular substrate, the filler piece spreads the driver recovery forces more evenly over the coupling means so as to increase the uniformity of the consolidation. Also provided is a kit of parts for coupling or reinforcing elongate objects, comprising a heat-recoverable driver, coupling means comprising fibre reinforcement and a polymeric material capable of flowing and consolidating with the fibre reinforcement when the driver is heated to recover it around the coupling means surrounding the said object(s), and at least one filler piece shaped so that, when placed in use between the driver and the coupling means when positioned around a sharp-cornered or irregular elongate object, the filler piece spreads the driver recovery forces more evenly over the coupling means so as to increase the uniformity of the consolidation.

Kits of parts assemblable to provide the other assemblies, or to perform the other methods, according to this invention are also provided, for example a kit of parts for pipe coupling comprising a heat-recoverable driver, coupling means comprising fibre reinforcement and a heat-flowable polymeric material, and a liner of substantially impervious material for the coupling means, the coupling means and liner being arrangeable in use around the contiguous ends of the pipes to be coupled, and the driver being arrangable around the coupling means so that heat can be applied to cause recovery of the driver and to cause the flowable polymeric material to flow such that the recovering driver will consolidate the coupling means and thereby couple the pipes together; or for example a kit of parts for forming a composite article, comprising a heat-recoverable driver and a braid made from fibres coated or impregnated with a polymeric material which polymeric material has a sufficiently high softening temperature and is arranged on the fibres so that when the driver is assembled around the braid and heat is applied to recover the driver, the braid is caused to change its braid angle by slippage of the braid fibres at their cross-over points to conform to the shape of the recovering driver, and then on further heating the polymeric material is caused to flow and consolidate with the braid to form the composite article. In such kits it is preferred that the driver and/or the coupling means or braid is or are in tubular form, although flat or open forms which can be wrapped around the objects in question are also possible. The liner, if present, may be pre-assembled with the coupling means or braid, or the coupling means or braid may be pre-assembled with the driver.

Apart from couplings, especially pipe couplings, the methods, kits and assemblies of the present invention may be especially useful when consolidated about a tubular load-bearing structural member to reinforce the structural member over a substantial part of its length or when consolidated about a fibrous covering surrounding a tubular member to provide an outer layer thereon which is substantially impervious to fluid with which the fibrous covering might otherwise come into contact in use. For example, reinforcement of structural tubular alloy members such as wing struts in microlight aircraft with up to four layers of glass fibre/polyamide consolidated by recovery thereover of a polyvinylidene fluoride driver (subsequently removed) may increase the load to bend of the structural members by up to 33% with minimal increase in weight. As another example, fibrous heat insulation around hot air ducts in aircraft can be rendered impervious to aricraft fuel by application of a suitably formulated consolidated composite according to this invention over the insulation. Square tubular wave guides can be reinforced by consolidation thereon of a fibre/polymer composite using suitably shaped filler pieces according to this invention.

A preferred form of refrigerator pipe coupling can be formed by abraiding and degreasing the pipe ends and (preferably loosely) swaging one inside the other, positioning around the swaged joint a liner of substantially non-cross-linked polyvinylidene fluoride and three layers of glass fibre braid carrying polyamide (Nylon Trade Mark), and recovering thereover a tubular driver of heat-recoverable polymer preferably cross-linked Nylon 12 (Trade Mark), to consolidate the glass/polyamide composite. Three layers of the glass/polyamide are used to ensure substantially 100% surface coverage.

The coupling means or braid, and/or the liner if present, may comprise curable polymeric material.

What is claimed is:

1. A method of coupling two substrates comprising (a) positioning to bridge contiguous portions of the substrates a coupling assembly comprising a heat-recoverable tubular driver and telescoped with the driver tubular coupling means comprising substantially unconsolidated fibre reinforcement and heat-flowable polymeric material, and (b) applying heat to recover the driver and to cause the polymeric material to flow such that the recovering driver consolidates the coupling means, thereby coupling the substrates together, wherein the fibre reinforcement is provided by a braid and the fibres of the braid individually carry the polymeric material, which polymeric material has a sufficiently high softening temperature so that when the heat is applied to recover the driver the braid is caused to change its braid angle by slippage of the braid fibres at their cross-over points to conform to the shape of the recovering driver before further heating causes the polymeric material to flow such that the recovering driver consolidates the coupling means.

2. A method according to claim 1, wherein contiguous ends of the substrates are coupled together.

3. A method according to claim 1, wherein abutting portions of the substrates are coupled together.

4. A method according to claim 3, wherein abutting ends of the substrates are coupled together in an end-to-end butt joint.

5. A method according to claim 1, wherein at least one of the substrates has a hollow end and the end of the other substrates is positioned within the hollow end.

6. A method according to claim 1, wherein the consolidation of the coupling means bonds it to the substrates.

7. A method according to claim 1, wherein the driver on recover recovers with a force in the range 0.2 to 60 N/cm$^2$, preferably in the range 50 to 60 N/cm$^2$.

8. A method according to claim 1, wherein the polymeric material of the fibre coupling means has a viscosity of at least 2500 Poise, preferably at least 3000 Poise, at the temperature at which the consolidation takes place.

9. A method according to claim 1, wherein the coupling means comprises carbon fibre carrying an aromatic polymer preferably a polyaryletherketone.

10. A method according to claim 1, wherein the coupling means comprises glass fibre carrying with a polyamide.

11. A method according to claim 1, wherein the driver comprises a polyaryletherketone.

12. A method according to claim 1, wherein the driver comprises cross-linked polyamide.

13. A method according to claim 1, wherein a liner of substantially impermeable material is positioned between the coupling means and the substrates.

14. A method according to claim 1, wherein a liner of substantially impermeable material is positioned between the coupling means and the substrates and the liner extends only part way along the length of the coupling means.

15. A method according to claim 1, wherein a liner of substantially impermeable material is positioned between the coupling means and the substrates and the liner comprises substantially non-crosslinked polyvinylidene fluoride.

16. A method according to claim 1, wherein a liner of substantially impermeable material is positioned between the coupling means and the substrates and the liner is coated with a layer of adhesive on the surface which faces the substrates.

17. A method according to claim 1, wherein there is provided at least one filler piece between the driver and the coupling means shaped so when positioned around a sharp-cornered or irregular substrate, the filler piece spreads the driver evenly over the surface of the substrate so as to increase the uniformity of the consolidation.

18. A method according to claim 17, wherein at least one filler piece is shaped to provide a substantially smoothly convex substantially continuous outer surface on which the recovering driver will bear.

19. A method according to claim 1, wherein the substrates comprise two pipes.

20. A method according to claim 1, wherein the substrates comprise two refrigerator pipes.

21. An assembly for forming a composite article comprising a heat recoverable driver and a braid made from fibres carrying a polymeric material, which polymeric material has a sufficiently high softening temperature and is arranged on the individual fibres so that when the assembly is heated to recover the driver, the braid is caused to change its braid angle by slippage of the braid fibres at their cross-over points to conform to the shape of the recovering driver, and then on further heating the polymeric material is caused to flow and consolidate the braid to form the composite article.

22. A coupling assembly for coupling elongate objects, comprising a heat recoverable tubular driver and telescoped therewith tubular coupling means comprising substantially unconsolidated fibre reinforcement in the form of a braid whose fibres individually carry a polymeric material that is capable of flowing when the assembly is heated, the arrangement being such that the assembly can be heated when positioned around the elongate objects to recover the driver and to consolidate the coupling means, thereby coupling the objects together and such that the consolidated coupling means alone is capable of coupling the elongate objects after removal of the recovered driver, the flowable polymeric material being substantially solid at least at the intended operating temperature of the consolidated coupling means and having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the coupling means.

23. An assembly according to claim 22, wherein the driver on recovery recovers with a force in the range of 0.2 to 60 N/cm$^2$, preferably in the range of 50 to 60 N/cm$^2$.

24. An assembly according to claim 22, wherein the polymeric material of the fibre coupling means has a viscosity of at least 2500 Poise, preferably at least 3000 Poise, at the temperature at which the consolidation takes place.

25. An assembly according to claim 22, wherein the coupling means comprises carbon fibre carrying an aromatic polymer preferably a polyaryletherketone.

26. An assembly according to claim 22, wherein the coupling means comprises glass fibre carrying a polyamide.

27. An assembly according to claim 22, wherein the driver comprises a polyaryletherketone.

28. An assembly according to claim 22, wherein the driver comprises a material selected from the group consisting of cross-linked polyvinylidene fluoride and cross-linked polyamide.

29. An assembly according to claim 22 wherein a liner of substantially impermeable material is positioned between the coupling means and the substrates.

30. An assembly according to claim 22, wherein a liner of substantially impermeable material is positioned between the coupling means and the substrates and the liner extends only part way along the length of the coupling means.

31. An assembly according to claim 22, wherein a liner of substantially impermeable material is positioned between the coupling means and the substrates and the liner comprises substantially non-crosslinked polyvinylidene fluoride.

32. An assembly according to claim 22, wherein a liner of substantially impermeable material is positioned between the coupling means and the substrates and the liner is coated with a layer of adhesive on the surface which faces the substrates.

33. An assembly according to claim 22, wherein there is provided at least one filler piece between the driver and the coupling means shaped so when positioned around a sharp-cornered or irregular substrate, the filler piece spreads the driver recovery forces more evenly over the surface of the substrate so as to increase the uniformity of the consolidation.

34. An assembly according to claim 22, wherein there is provided at least one filler piece between the driver and the coupling means shaped so when positioned around a sharp-cornered or irregular substrate, the filler piece spreads the driver recovery forces more evenly over the surface of the substrate so as to increase the uniformity of the consolidation, and the filler piece is shaped to provide a substantially smoothly convex substantially continuous outer surface on which the recovering driver will bear.

35. An assembly according to claim 22 wherein said elongated objects comprise two pipes.

36. An assembly according to claim 22 wherein said elongated objects comprise two refrigerator pipes.

37. A pipe coupling assembly comprising a heat-recoverable tubular driver and telescoped therewith tubular coupling means comprising substantially unconsolidated fibre reinforcement in the form of a braid whose fibres individually carry a polymeric material that is capable of flowing when the assembly is heated, the arrangement being such that the assembly can be heated when positioned around contiguous ends of the pipes to be coupled, to recover the driver and to consolidate the coupling means thereby substantially unconsolidated fibre reinforcement in the form of a braid whose fibres individually carry a heat-flowable polymeric material, and a liner of substantially impervious material for the coupling means, the coupling means and liner being arrangeable in use around the contiguous ends of the pipes to be coupled, and the driver being arrangeable around the coupling means so that heat can be applied to cause recovery of the driver and to cause the flowable polymeric material to flow such that the recovering driver will consolidate the coupling means and thereby couple the pipes together, the polymeric material having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the coupling means.

38. A kit of parts for pipe coupling comprising a heat-recoverable driver, coupling means comprising coupling the pipes together, the flowable polymeric material being substantially solid at least at the intended operating temperature of the consolidated coupling means and having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the coupling means.

39. A kit according to claim 38, wherein the driver and the coupling means are in tubular form.

40. A kit according to claim 38, wherein the coupling means is pre-assembled with the driver.

41. A kit according to claim 38, wherein the liner is preassembled with the coupling means.

42. A kit according to claim 38, wherein the liner of substantially impermeable material is positioned such that it can be sandwiched in use between the coupling means and the substrate.

43. A kit according to claim 38, wherein the liner extends only part way along the length of the coupling means.

44. A kit according to claim 38, wherein the liner comprises substantially non-crosslinked polyvinylidene fluoride.

45. A kit according to claim 38, wherein the liner is coated with a layer of adhesive on the surface which will face the substrate in use.

46. A kit of parts for forming a composite article, comprising a heat-recoverable driver and a braid made from fibres carrying a polymeric material which polymeric material has a sufficiently high softening temperature and is arranged on the fibres so that when the driver is assembled around the braid and heat is applied to recover the driver, the braid is caused to change its braid angle by slippage of the braid fibres at their cross-over points to conform to the shape of the recovering driver, and then on further heating the polymeric material is caused to flow and consolidate with the braid to form the composite article.

47. A kit of parts for coupling or reinforcing elongate objects, comprising a heat recoverable driver, coupling means comprising substantially unconsolidated fibre reinforcement in the form of a braid whose fibres individually carry a polymeric material capable of flowing and consolidating with the fibre reinforcement when the driver is heated to recover it around the coupling means surrounding the said object, and at least one filler piece shaped so that, when placed in use between the driver and the coupling means when positioned around a sharp-cornered or irregular elongate object, the filler piece spreads the driver recovery forces more evenly over the surface of the substrate so as to increase the uniformity of the consolidation, the polymeric material having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the coupling means.

48. A method of forming a composite tubular member comprising (i) providing a heat recoverable driver and a tubular member telescoped therewith, the tubular member comprising substantially unconsolidated fibre reinforcement in the form of a braid whose fibres individually carry a melt-flowable polymeric material, (ii) positioning the telescoped members around an inner forming-mandrel and (iii) heating the telescoped members to cause the driver to recover to urge the first tubular member into contact with the mandrel and to consolidate the first tubular member, the polymeric having a viscosity of at least 2500 Poise at the temperature at which consolidation takes place and having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the coupling means.

49. A reinforcing assembly for reinforcing a tubular load-bearing structural member over a substantial part of its length, comprising a heat recoverable tubular driver and telescoped therewith a tubular reinforcing means comprising substantially unconsolidated fibre reinforcement in the form of a braid whose fibres individually carry a polymeric material that is capable of flowing when the assembly is heated, the arrangement being such that the assembly can be heated when positioned around the structural member to recover the driver and to consolidate the reinforcing means, thereby reinforcing the structural member, and such that the consolidated reinforcing means alone is capable of reinforcing the structural member after removal of the recovered driver, the flowable polymeric material being substantially solid at least at the intended operating temperature of the consolidated reinforcing means and having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the reinforcing means.

50. An assembly for providing a substantially fluid-impermeable outer layer over a tubular member having a fibrous covering, comprising a heat recoverable tubular driver and telescoped therewith a tubular sealing means comprising substantially unconsolidated fibre reinforcement in the form of a braid whose fibres individually carry a polymeric material that is capable of flowing when the the assembly is heated, the arrangement being such that the assembly can be heated when positioned around the tubular member to recover the driver and to consolidate the sealing means, thereby providing a substantially fluid-impermeable outer layer over the tubular member, and such that the consolidated sealing means alone is capable of sealing the tubular member after removal of the recovered driver, the flowable polymeric material being substantially solid at least at the intended operating temperature of the consolidated sealing means and having a sufficiently high softening temperature so that when heat is applied to recover the driver, the braid is caused to change its braid angle by slippage of the braid fibres at their cross-over points to conform to the shape of the recovering driver before further heating causes the polymeric material to flow such that the recovering driver consolidates the sealing means.

* * * * *